United States Patent
Lee et al.

(10) Patent No.: US 8,059,720 B2
(45) Date of Patent: Nov. 15, 2011

(54) IMAGE DOWN-SAMPLING TRANSCODING METHOD AND DEVICE

(75) Inventors: Yung-Lyul Lee, Seoul (KR); Euee-S. Jang, Seoul (KR); Chung-Ku Lee, Inchon (KR)

(73) Assignee: Humax Co., Ltd., Bundang-gu, Gyeonggi-do (KR)

( * ) Notice: Subject to any disclaimer, the term of this patent is extended or adjusted under 35 U.S.C. 154(b) by 1541 days.

(21) Appl. No.: 11/289,651

(22) Filed: Nov. 30, 2005

(65) Prior Publication Data

US 2006/0133502 A1 Jun. 22, 2006

(30) Foreign Application Priority Data

Nov. 30, 2004 (KR) .................. 10-2004-0099148
Nov. 9, 2005 (KR) .................. 10-2005-0107223

(51) Int. Cl.
*H04B 7/12* (2006.01)
*H04B 1/66* (2006.01)

(52) U.S. Cl. ......... 375/240.16; 375/240.12; 375/240.21; 375/240.24

(58) Field of Classification Search ............. 375/240.16, 375/240.24, 240.21, 240.12
See application file for complete search history.

(56) References Cited

U.S. PATENT DOCUMENTS

| | | | |
|---|---|---|---|
| 7,526,027 B2 * | 4/2009 | Sekiguchi et al. ....... | 375/240.16 |
| 2004/0081238 A1 * | 4/2004 | Parhy ....................... | 375/240.16 |
| 2004/0161157 A1 * | 8/2004 | Sato et al. ................ | 382/236 |
| 2005/0041740 A1 | 2/2005 | Sekiguchi et al. | |

FOREIGN PATENT DOCUMENTS

| | | |
|---|---|---|
| EP | 1475971 A1 | 11/2004 |
| JP | 2003309851 A | 10/2003 |

OTHER PUBLICATIONS

Korean Intellectual Property Office, Preliminary Rejection Letter in Korean priority application (mailed Nov. 17, 2006).
Crochiere, Ronald E. and Rabiner, Lawrence R., Interpolation and Decimation of Digital Signals—A Tutorial Review, Proceedings of the IEEE, Mar. 1981, vol. 69, No. 3.
Wiegand, Thomas, Text of Final Committee Draft of Joint Video Specification, International Organisation for Standardisation, Jul. 2002, ISO/IEC JTC1/SC29/WG11, Klagenfurt, Austria.
Lim, Keng-Pang, Sullivan, Gary, and Wiegand, Thomas, Text Description of Joint Model Reference Encoding Methods and Decoding Concealment Methods, Joint Video Team (JVT) of ISO/IEC MPEG and ITU-T VCEG, Mar. 2004, Munich, Germany.
European Patent Office, Office Action for European Patent Application No. 05026095.9 (counterpart to above-captioned patent application), dated May 18, 2011.

* cited by examiner

*Primary Examiner* — King Poon
*Assistant Examiner* — Neil R McLean
(74) *Attorney, Agent, or Firm* — Baker Botts L.L.P.

(57) ABSTRACT

In an image down-sampling transcoding method, by reducing an MPEG SP (simple profile) video bit stream having a CIF (Common Intermediate Format) size into a half in image size in a pixel domain, the video bit stream is converted into a H.264 BP (Baseline Profile) video stream having a QCIF (Quarter CIF) size. Accordingly, it is possible to downsample an image from MPEG-4 to H.264 at a high speed.

8 Claims, 21 Drawing Sheets

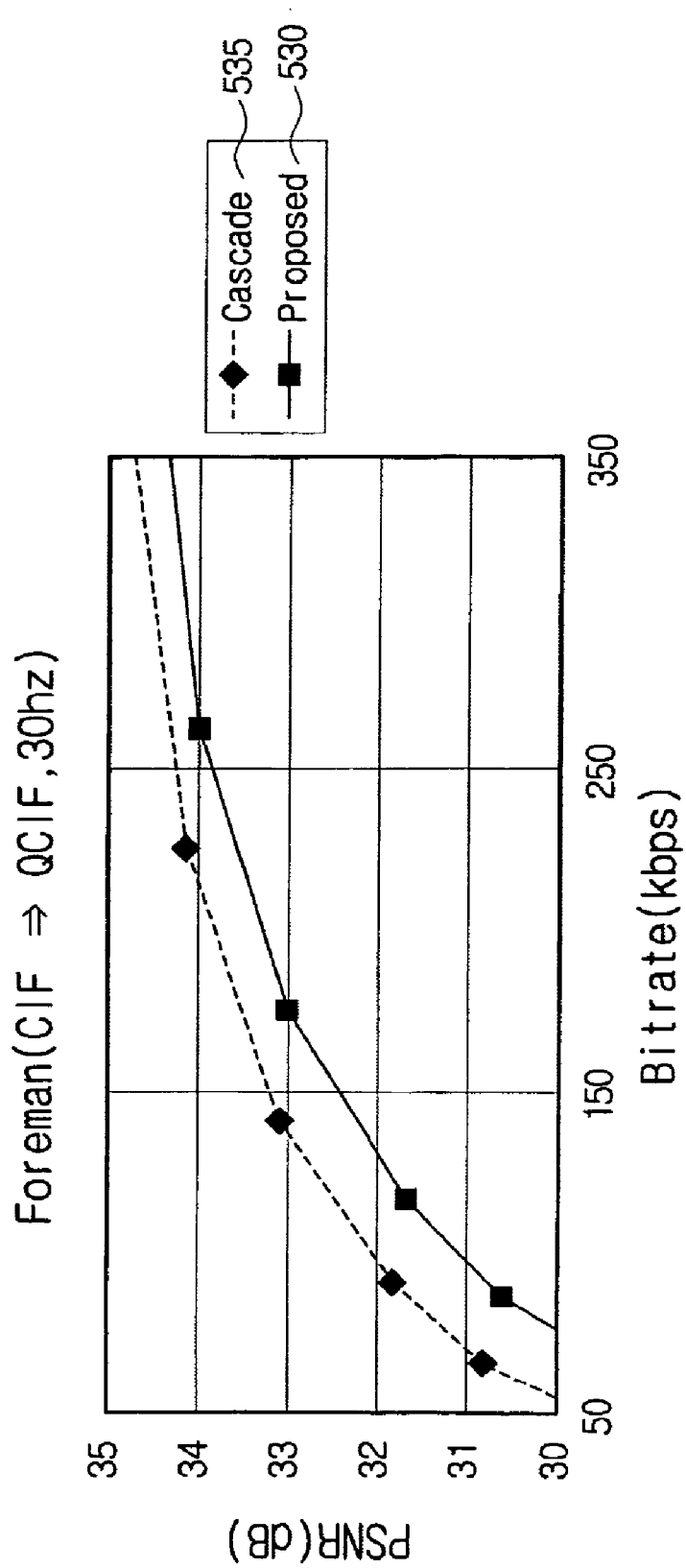

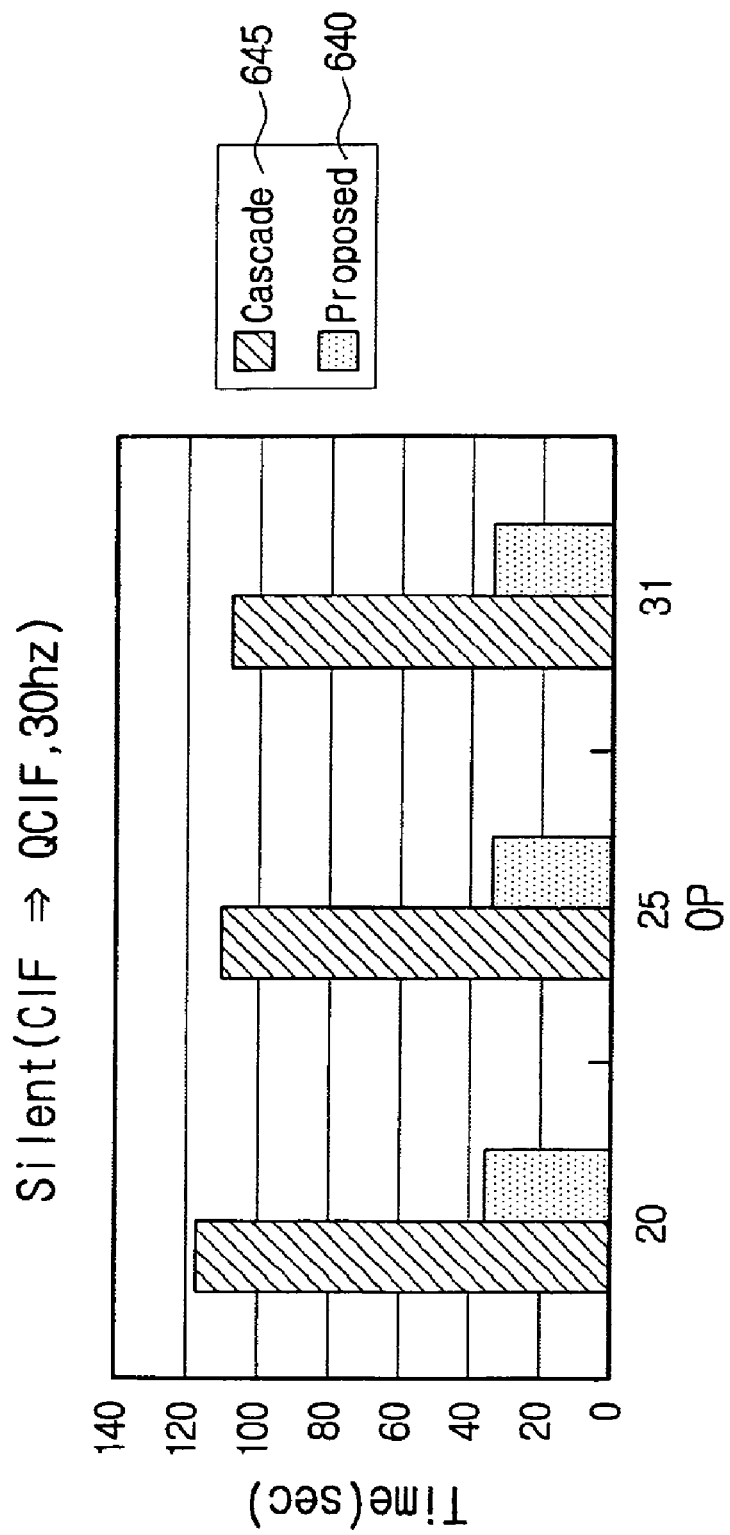

IMAGE DOWN-SAMPLING TRANSCODING METHOD AND DEVICE

BACKGROUND OF THE INVENTION

1. Field of the Invention

The present invention relates to image down-sampling coding method and device, and more particularly, to method and device for performing an image down-sampling process from MPEG-4 to H.264 at a high speed.

2. Description of the Related Art

Thanks to development of computers and networks, a variety of data can be transmitted from a transmission party to a reception party. There have been developed multimedia standard compression formats for transmitting large-capacity multimedia data through networks. There have been introduced various video transcoding methods of performing conversion processes suitable for circumferences of the transmission party and the reception party by considering QoS (Quality of Service) of both parties Such video coding methods are roughly divided into a transcoding method in a pixel domain and a transcoding method in a DCT (Discrete Cosine Transform) domain.

The best transcoding method in view of image quality is a cascaded pixel-domain transcoding method of decoding input bit streams of images and encoding the decoded images again. However, since the encoding process is performed once more, such a conventional method has a problem with increase in complexity. Therefore, in order to decrease the complexity of calculation, efficient transcoding methods for down-sampling an image in the DCT domain have been studied and developed.

FIG. 1 shows a configuration of an H.264 encoder according to a related art.

The conventional H.264 encoder includes a loop filter 110. When the transcoding process of down-sampling an image from MPEG-4 to H.264 is performed, there is a problem that a direct transcoding in the DCT domain is impossible due to the H.264 non-linear loop filter 110.

Therefore, an efficient transcoding method which can reduce the complexity while maintaining the image quality is required.

SUMMARY OF THE INVENTION

The present invention is contrived to solve the above-mentioned problems. It is an object of the present invention is to provide image down-sampling transcoding method and device which can reduce complexity while maintaining image quality by re-using information on macro blocks.

Another object of the invention is to provide transcoding method and device for down-sampling an image from MPEG-4 to H.264 at a high speed. Other objects of the invention will become apparent from exemplary embodiments to be described later.

According to a first aspect of the present invention, there is provided a method of performing an image down-sampling process from MPEG-4 to H.264 at a high speed.

According to an exemplary embodiment of the invention, there is provided an image down-sampling transcoding method for converting a first image having a first format into a second image having a second format, the image down-sampling transcoding method comprising: (a) decoding a bit stream encoded in the first format; (b) down-sampling a macro block of a predetermined unit in the decoded first image by the use of a predetermined filtering method; (c) calculating a calculation value corresponding to the down-sampled macro block of the first image by the use of predetermined calculation methods for predetermined candidate block modes in the second format; and (d) performing an encoding process with the candidate block mode having the least calculation value.

The predetermined filtering method in (b) may be any one of an average filtering method and a sync filtering method.

The candidate block mode may include two or more of an intra 16×16 mode, an intra 4×4 mode, an inter 16×16 mode, an inter 16×8 mode, an inter 8×16 mode, and a skip mode.

When the candidate block mode is the intra 16×16 mode or the intra 4×4, the predetermined calculation method may be a mean square error (MSE) method.

When the candidate block mode is any one of the inter 16×16 mode, the inter 16×8 mode, the inter 8×16 mode, the intra 16×16 mode, and the skip mode, the predetermined calculation method may be a rate-distortion optimization (RDO) method.

When the candidate block mode include the first candidate block mode which is at least one of the intra 16×16 mode and the intra 4×4 mode and the second candidate block mode which is at least one of the inter 16×16 mode, the inter 16×8 mode, the inter 8×16 mode, and the skip mode, the predetermined calculation method may be designed to perform the rate-distortion optimization method to the block mode having the least MSE among the first candidate block modes and the second candidate block modes.

A motion estimation process may be performed to the candidate block mode by the use of a motion vector generated in (a).

According to a second aspect of the invention, there is provided a device for performing an image down-sampling process from MPEG-4 to H.264 at a high speed.

According to an exemplary embodiment of the invention, there is provided an image down-sampling transcoding device for converting a first image having a first format into a second image having a second format, the image down-sampling transcoding device comprising: a decoding unit decoding a bit stream encoded in the first format; a down-sampling unit down-sampling a macro block of a predetermined unit in the decoded first image by the use of a predetermined filtering method; a calculation unit calculating a calculation value corresponding to the down-sampled macro block of the first image by the use of predetermined calculation methods for predetermined candidate block modes in the second format; an encoding unit performing an encoding process in the second format with the candidate block mode having the least calculation value.

The image down-sampling transcoding device may further comprise a motion estimation unit performs a motion estimation process to the down-sampled first image by the use of a motion vector in the first format.

The down-sampling unit may perform the down-sampling process by the use of any one of an average filtering method and a sync filtering method.

The candidate block mode may include two or more of an intra 16×16 mode, an intra 4×4 mode, an inter 16×16 mode, an inter 16×8 mode, an inter 8×16 mode, and a skip mode.

When the candidate block mode is the intra 16×16 mode or the intra 4×4, the predetermined calculation method may be a mean square error (MSE) method.

When the candidate block mode is any one of the inter 16×16 mode, the inter 16×8 mode, the inter 8×16 mode, the intra 16×16 mode, and the skip mode, the predetermined calculation method may be a rate-distortion optimization (RDO) method.

When the candidate block mode include the first candidate block mode which is at least one of the intra 16×16 mode and the intra 4×4 mode and the second candidate block mode which is at least one of the inter 16×16 mode, the inter 16×8 mode, the inter 8×16 mode, and the skip mode, the predetermined calculation method may be designed to perform the rate-distortion optimization method to the block mode having the least MSE among the first candidate block modes and the second candidate block modes.

BRIEF DESCRIPTION OF THE DRAWINGS

The above and other features and advantages of the present invention will become more apparent by describing in detail exemplary embodiments thereof with reference to the attached drawings in which:

FIGS. 5A to 5F are graphs illustrating rate-distortion curves of images obtained by transcoding CIF images of 30 Hz in a pixel domain into QCIF images with an image size reduced to a half;

FIGS. 6A to 6F are graphs illustrating processing time of images obtained by transcoding CIF images of 30 Hz in a pixel domain into QCIF images with an image size reduced to a half;

DETAILED DESCRIPTION OF THE EMBODIMENTS

Figure 1:
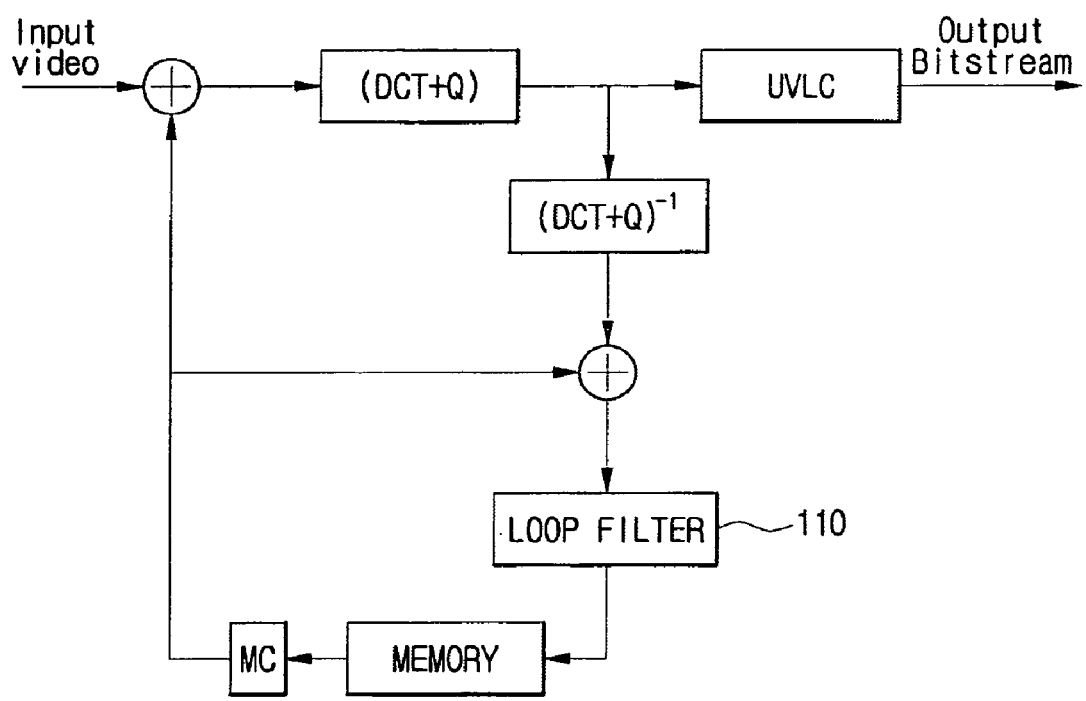
FIG. 1 is a diagram illustrating a configuration of an H.264 encoder according to the related art.

Hereinafter, image down-sampling transcoding method and device according to exemplary embodiments of the present invention will be described in detail with reference to the attached drawings such that the invention can be easily put into practice by those skilled in the art. In the drawings, like elements are denoted by like reference numerals and thus repeated description thereof is omitted.

The image down-sampling transcoding method and device according to the invention performs a transcoding function of transcoding MPEG SP (Simple Profile) video bit streams having a CIF (Common Intermediate Format) size into H.264 BP (Baseline Profile) video bit streams having a QCIF (Quarter CIF) size, which is reduced to a half in a pixel domain.

The transcoding device according to the invention may be an element of a media gateway supplying bit streams suitable for characteristics of reception parties. The transcoding device includes an MPEG-4 decoder decoding MPEG-4 bit streams and an H.264 encoder which is disposed at the rear stage of the MPEG-4 decoder and which serves to convert video data input from the MPEG-4 decoder into H.264 video bit streams. The transcoding device may further include a mode determining unit determining a block mode.

The determination of a block mode to be used for the encoding process by the H.264 encoder can be performed by the H.264 encoder or by a particular mode determining unit, so as to control the H.264 encoding. The H.264 encoder (or the mode determining unit) can further receive a motion vector (MV) of the respective pixel areas from the MPEG-4 decoder. The H.264 encoder according to the invention can be embodied to be equal to or similar to the conventional H.264 encoder (see. FIG. 1) (for example, to include the mode determining unit).

Since the configuration in which the MPEG-4 decoder and the H.264 encoder are sequentially coupled to each other can be easily understood by those skilled in the art, description there of is omitted. Hereinafter, the image down-sampling transcoding method which is performed by the transcoding device according to the invention will be mainly described.

Figure 2:
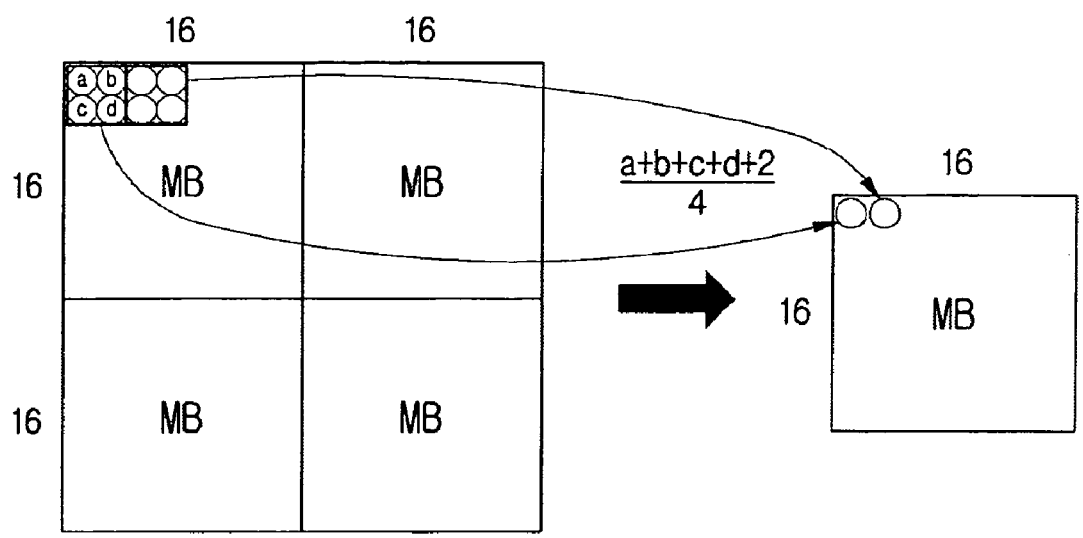
FIG. 2 is a diagram illustrating an image down-sampling method according to an exemplary embodiment of the invention.

FIG. 2 is a diagram illustrating the image down-sampling method according to an exemplary embodiment of the invention.

In the transcoding method shown in FIG. 2, the MPEG SP video bit streams having a CIF (Common Intermediate Format) size is reduced into a half in image size in the pixel domain and is converted into the H.264 BP video bit streams having a QCIF (Quarter CIF) size.

Through the down-sampling 2×2 macro blocks (MBs) in MPEG-4 into a 1×1 MB in H.264, four 16×16 mode macro blocks in the CIF image decompressed in MPEG-4 are reduced to one 16×16 mode macro block to form a QCIF image. This means that four pixels are reduced to one pixel and at this time an average filtering method is used. That is, one pixel value is obtained from a mean value of four pixel values.

MPEG-4 and H.264 have many differences in compression modes and are different from each other in kinds of block modes in one 16×16 MB and in methods for motion estimation.

MPEG-4 has two inter block modes of 16×16 and 8×8, a 16×16 intra block mode, and a skip mode for a macro block, and employs a ½ pixel motion estimation in a search range.

On the contrary, H.264 has seven inter block modes, two intra block modes, and a skip mode for each macro block and searches for a ¼ pixel motion vector optimal for each inter block mode. The seven inter block modes include inter block modes of 16×16, 16×8, 8×16, and inter block modes of 8×8 and 8×8, 8×4, 4×8, and 4×4 which are divided from an 8×8 block. The intrablock modes include an intra 16×16 block mode and an intra 4×4 block mode. H.264 uses four kinds of intra 16×16 encoding modes and nine kinds of intra 4×4 encoding modes. In order to improve PSNR in bit rates, a block mode optimal for each macro block among the possible encoding modes is determined through the use of a rate-distortion optimization (RDO) method employed non-normative in H.264. Since the H.264 encoder performs block matching motion estimation to all the block modes and determines the block modes through the rate-distortion optimization, the H.264 encoder is excellent in image quality and compression efficiency, but has a problem with increase in calculation complexity.

On the contrary, in the invention, in order to reduce the calculation complexity, a block mode in H.264 is determined and then motion vector information output from the MPEG-4 decoder is reused, when performing the image down-sampling transcoding from MPEG-4 to H.264. Accordingly, new block modes can be provided, not the existing block modes.

Figure 3:
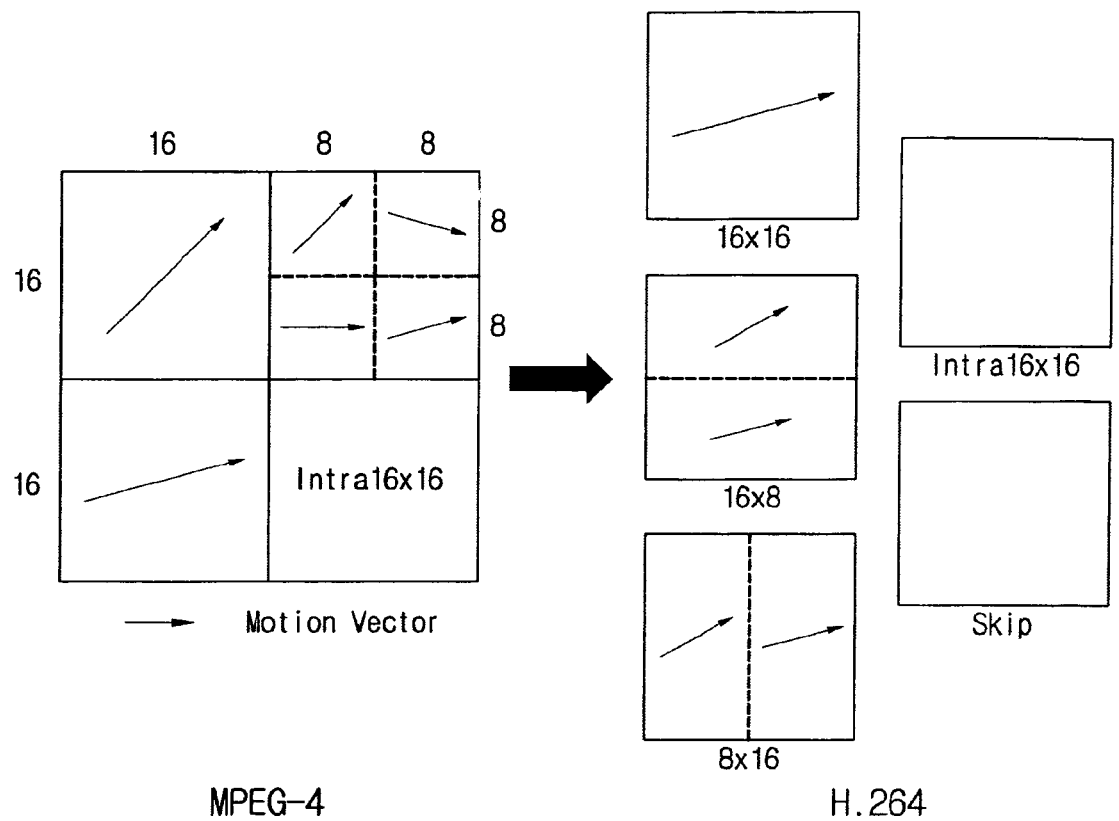
FIG. 3 is a diagram illustrating five block modes in H.264 at the time of transcoding 2×2 macro blocks in MPEG-4 into a 1×1 macro block in H.264 according to an exemplary embodiment of the invention.

FIG. 3 is a diagram illustrating five block modes in H.264 at the time of transcoding the 2×2 MBs in MPEG-2 to the 1×1 MB in H.264 according to an exemplary embodiment of the invention. Motion vectors (MV) which is supplied to the H.264 encoder from the MPEG-4 decoder is exemplified as arrows.

Now, block modes are described with respect to H.264 for the purpose of convenient explanation, but the invention may apply to other forms, of course.

Since an image output from the MPEG-4 decoder is reduced to ¼, the invention employs integer pixel motion vector data reduced to ½.

By using the intra 16×16 mode and the intra 4×4 mode for I (Intra) frames and using the MPEG-4 motion vector data for P (Predictive) frames, the H.264 encoder performs the motion estimation of the inter 16×16, 16×8, and 8×16 blocks shown in FIG. 3 and the calculation of the intra 16×16 mode and the skip mode with respect to one macro block in an ±2 integer pixel search range, and performs the motion estimation of an integer pixel unit with respect to the inter modes and then performs the motion estimation of ½ pixel unit and ¼ pixel unit.

In the intra 16×16 mode and the intra 4×4 mode, by calculating differences of estimated pixels for each estimation mode and then performing (DCT+Q) and $(DCT+Q)^{-1}$ to calculate mean square errors (MSE) of the respective modes instead of the rate-distortion optimization (RDO) requiring much time, the mode corresponding to the least MSE is determined as an intra mode.

The block modes smaller than the inter 8×8 mode do not affect the transcoding performance as a result of test. This is because the MPEG-4 encoding process serves as a LPF (Low Pass Filtering) process.

By using the above-mentioned processes, the motion estimation is performed to variable block modes and then the optimal block mode is determined through the rate-distortion optimization (RDO).

Figure 4:
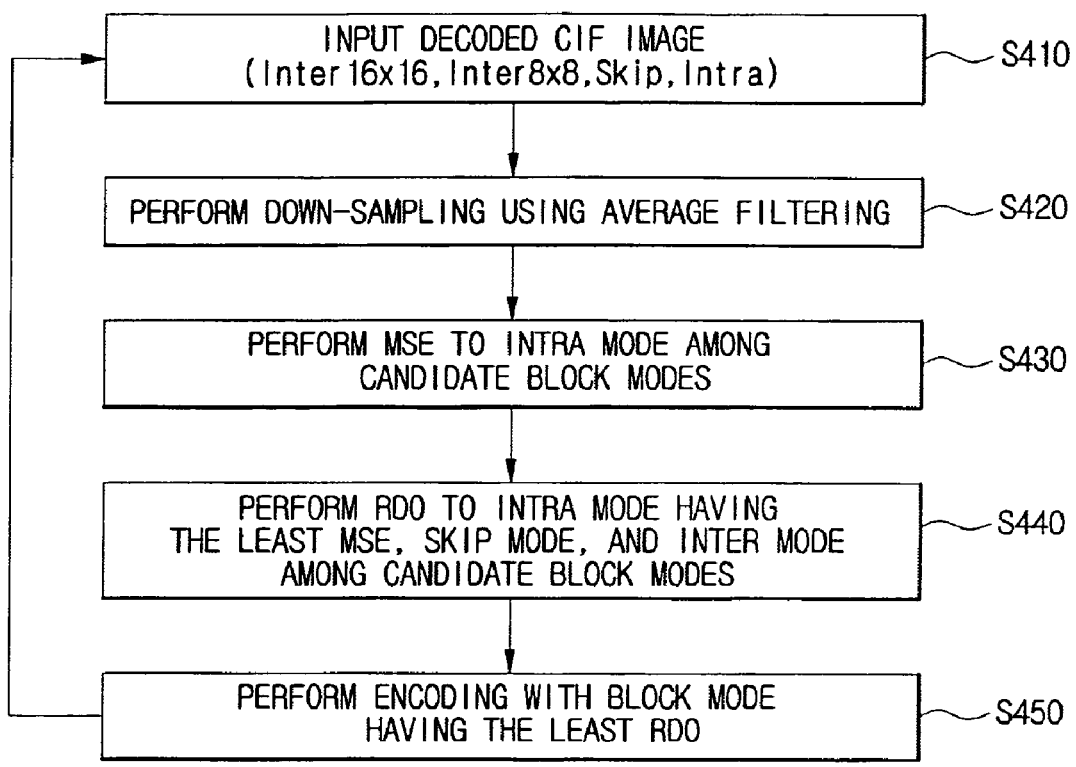
FIG. 4 is a flow diagram illustrating a pixel-domain transcoding method according to an exemplary embodiment of the invention.
Figure 5A:
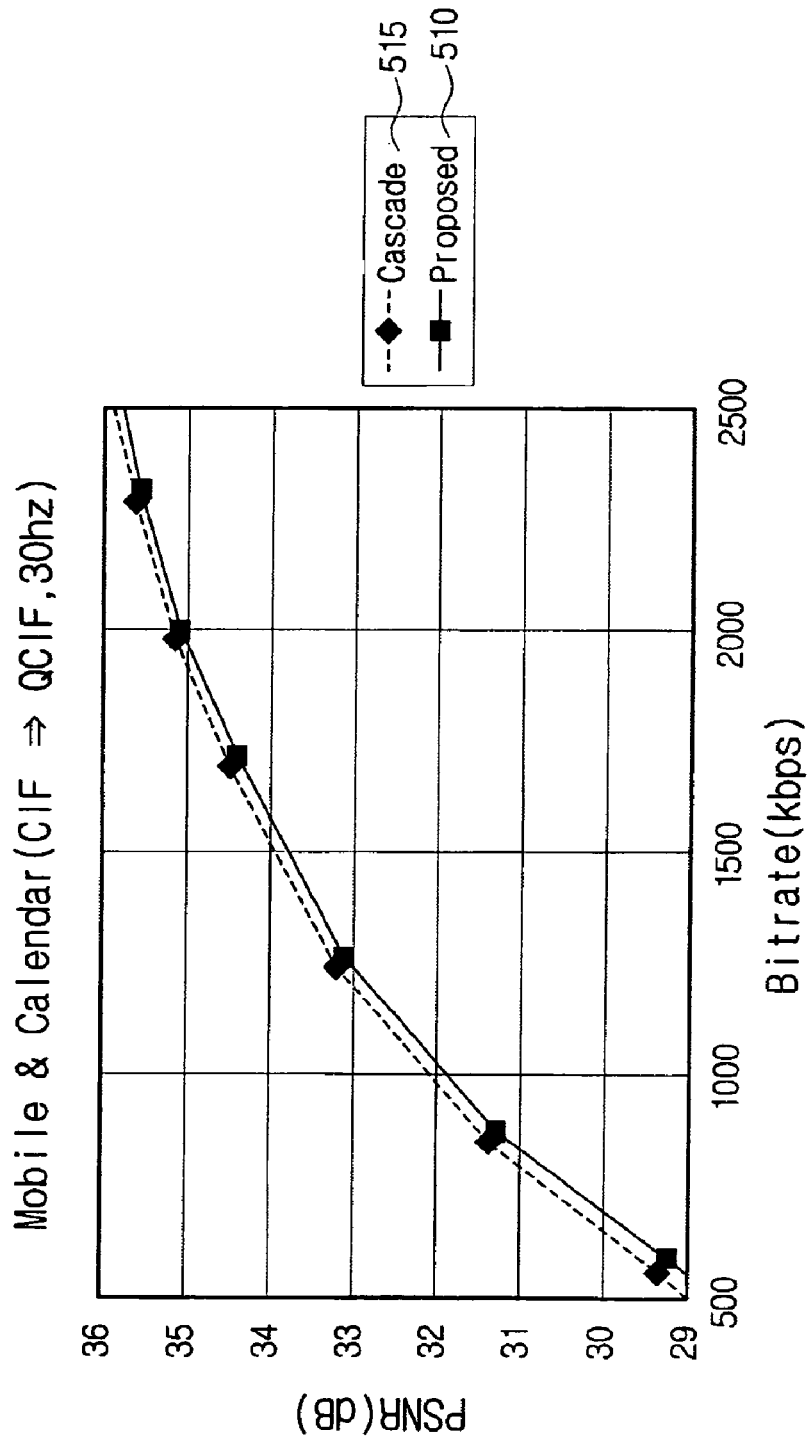
Figure 5B:
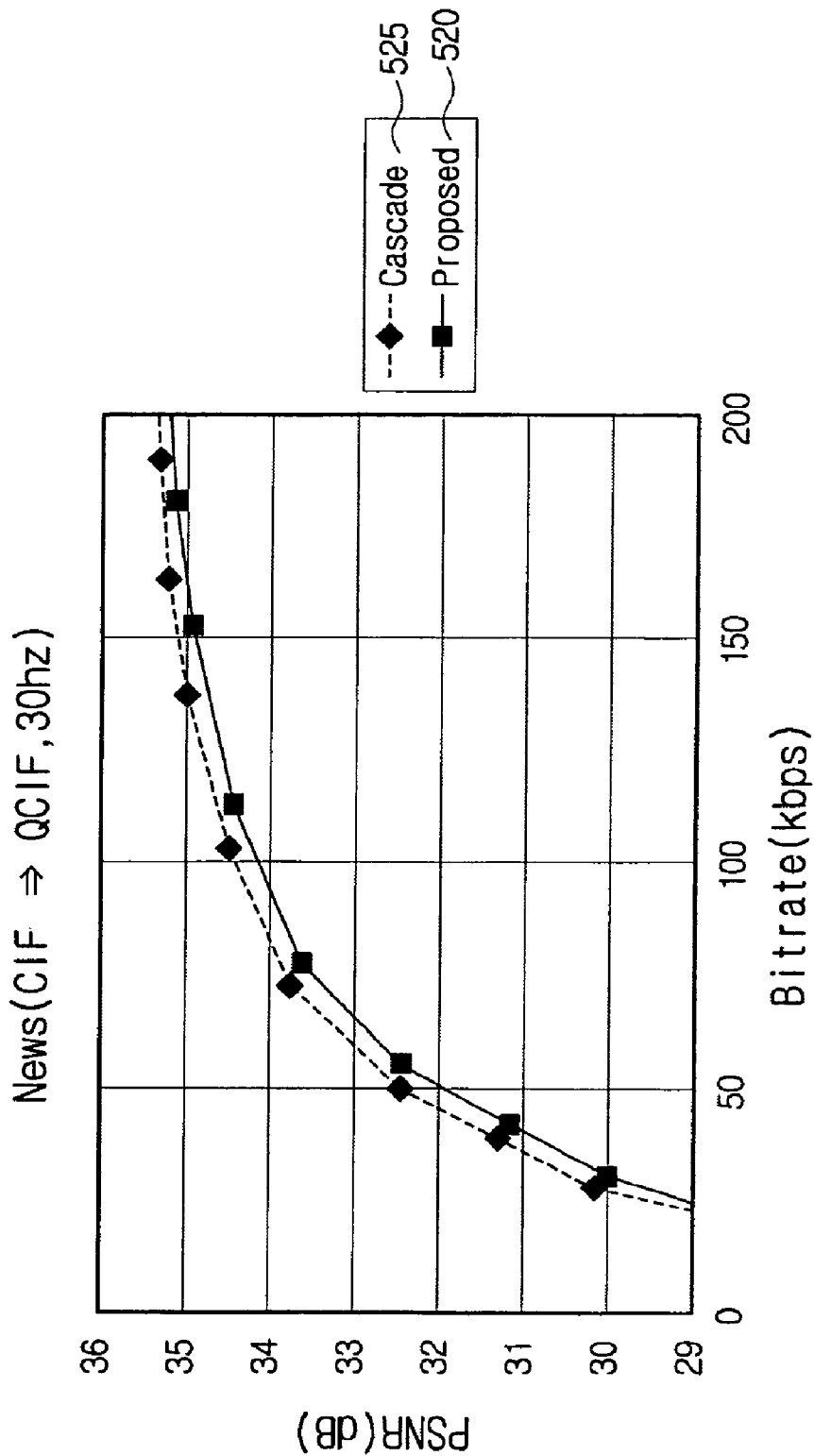
Figure 5D:
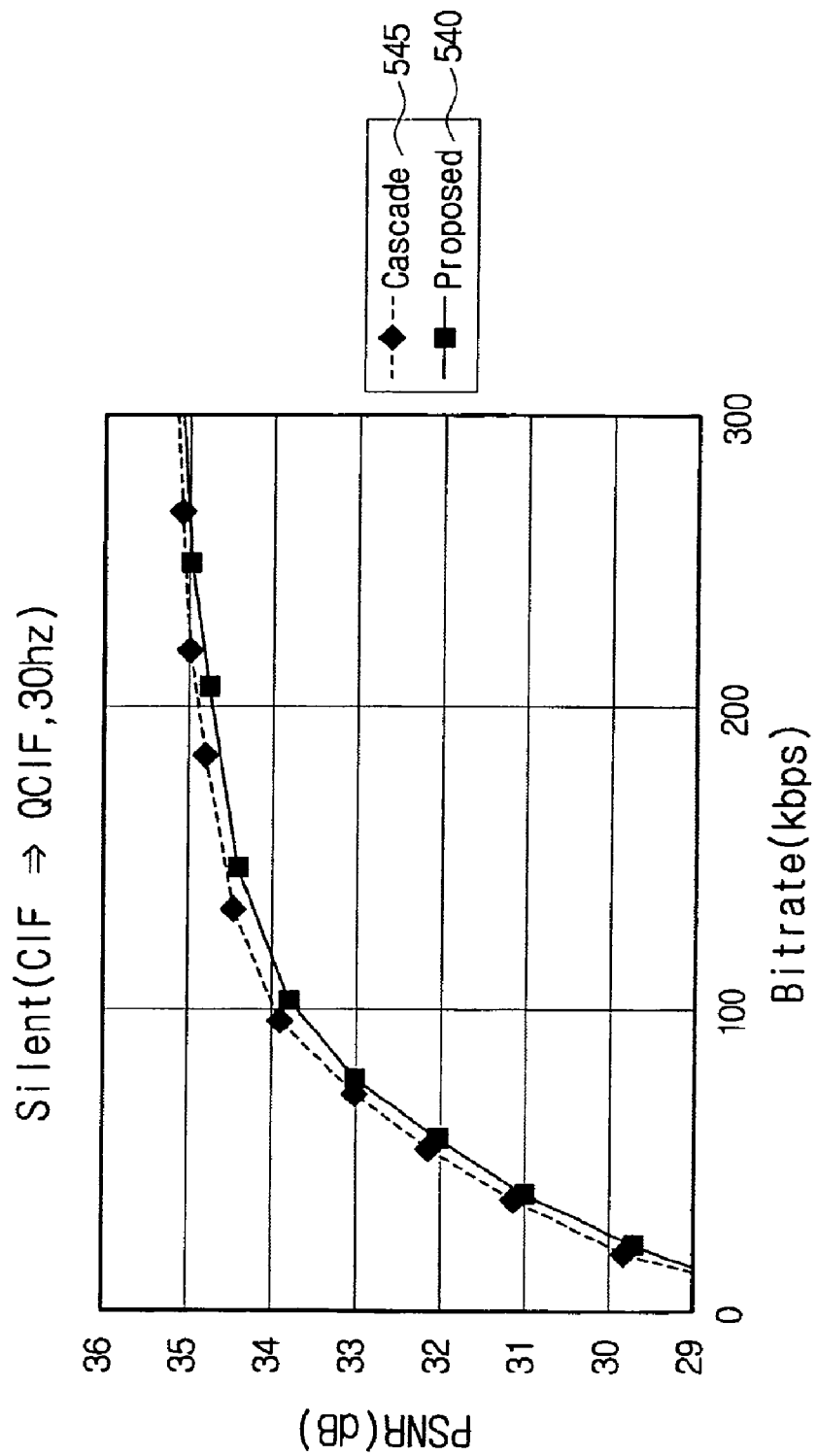
Figure 5E:
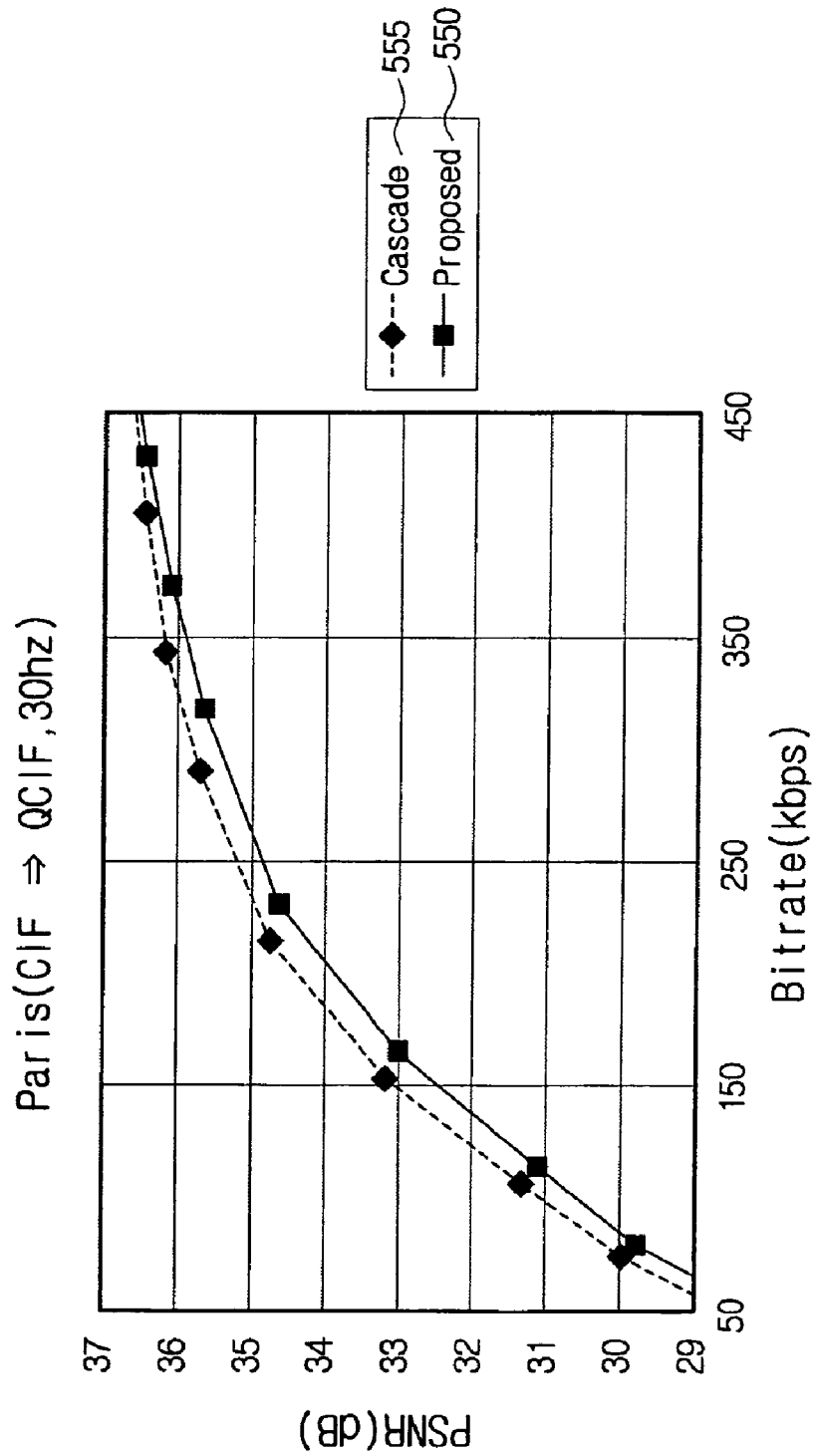
Figure 5F:
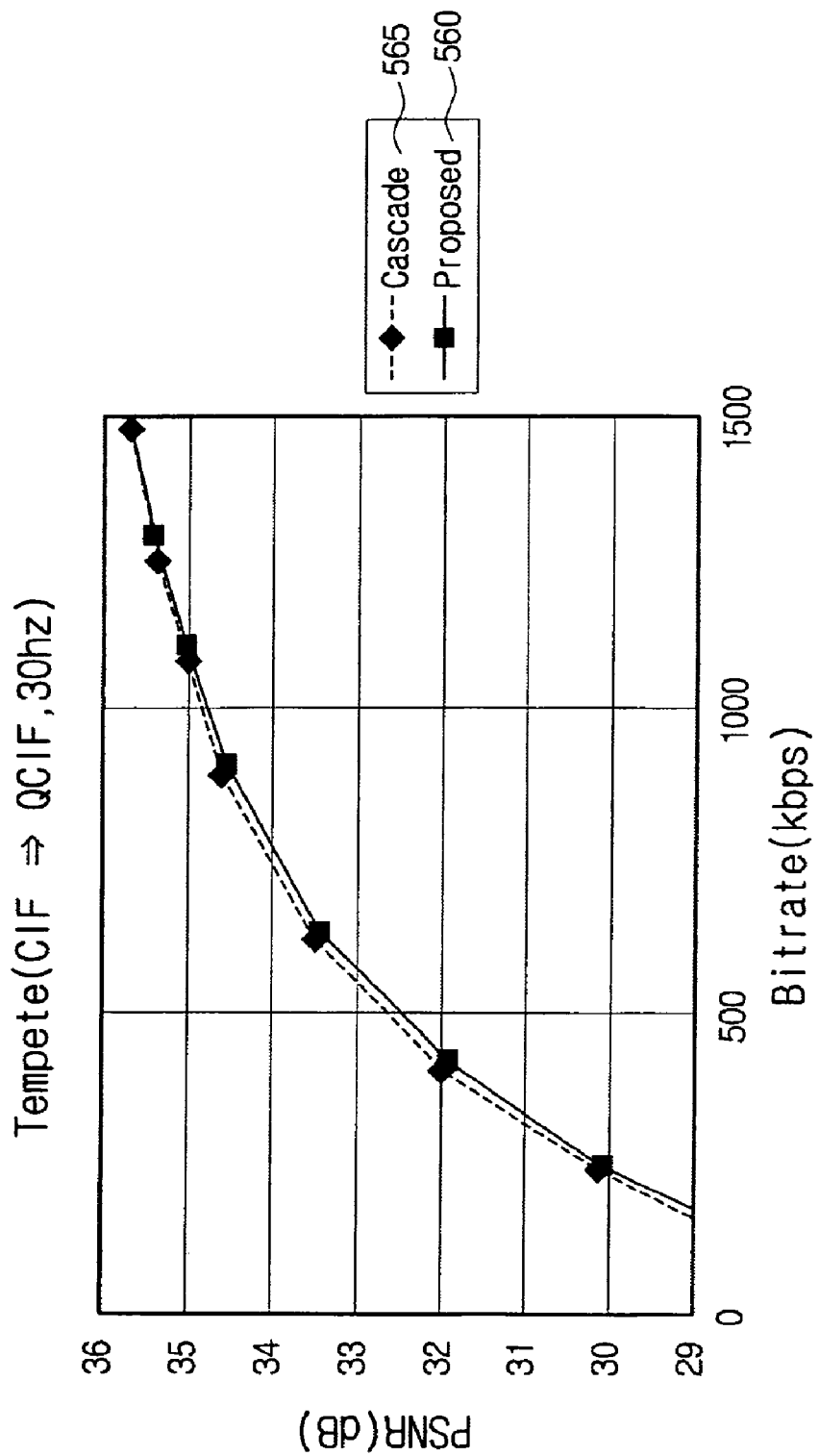
Figure 6A:
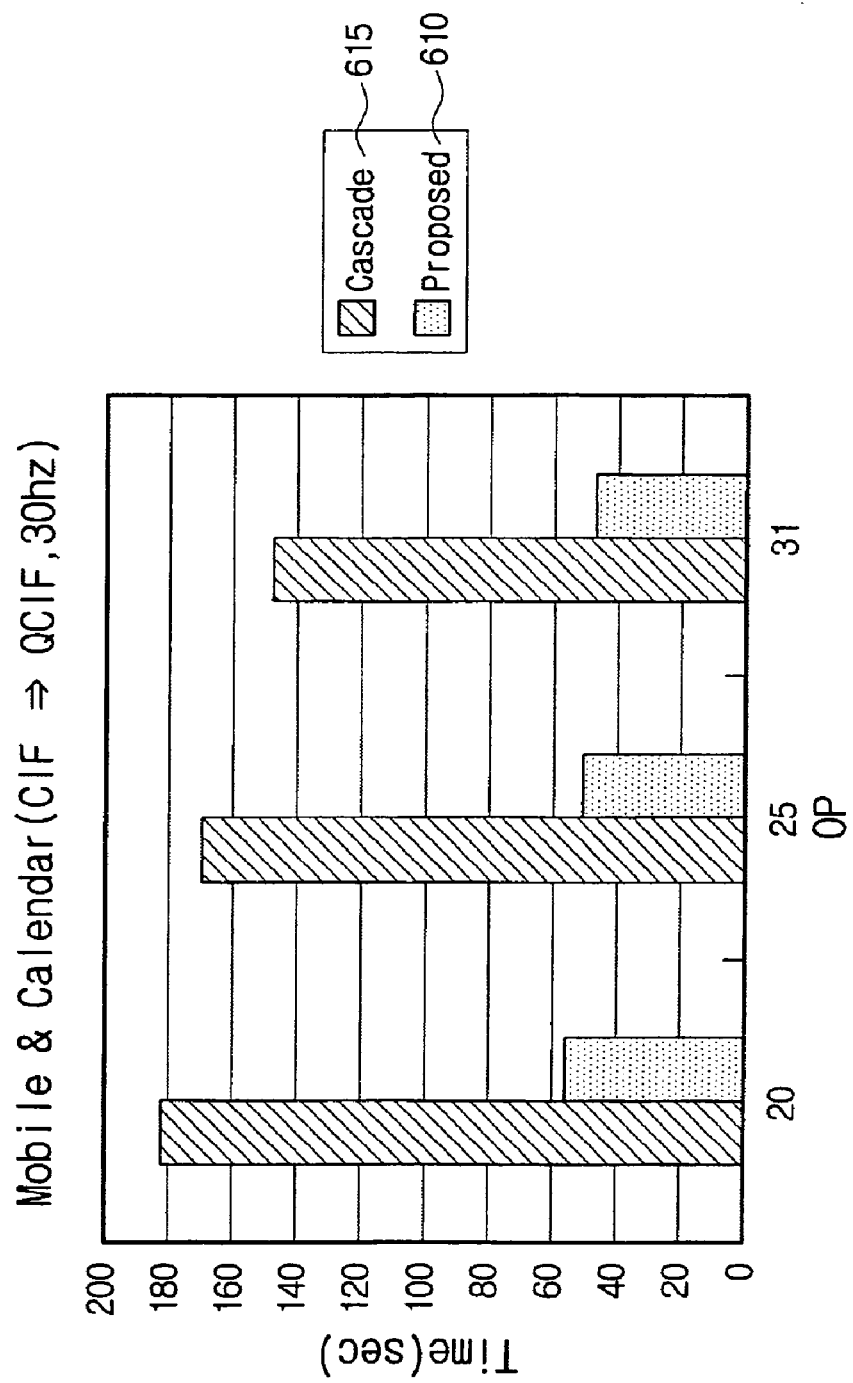
Figure 6B:
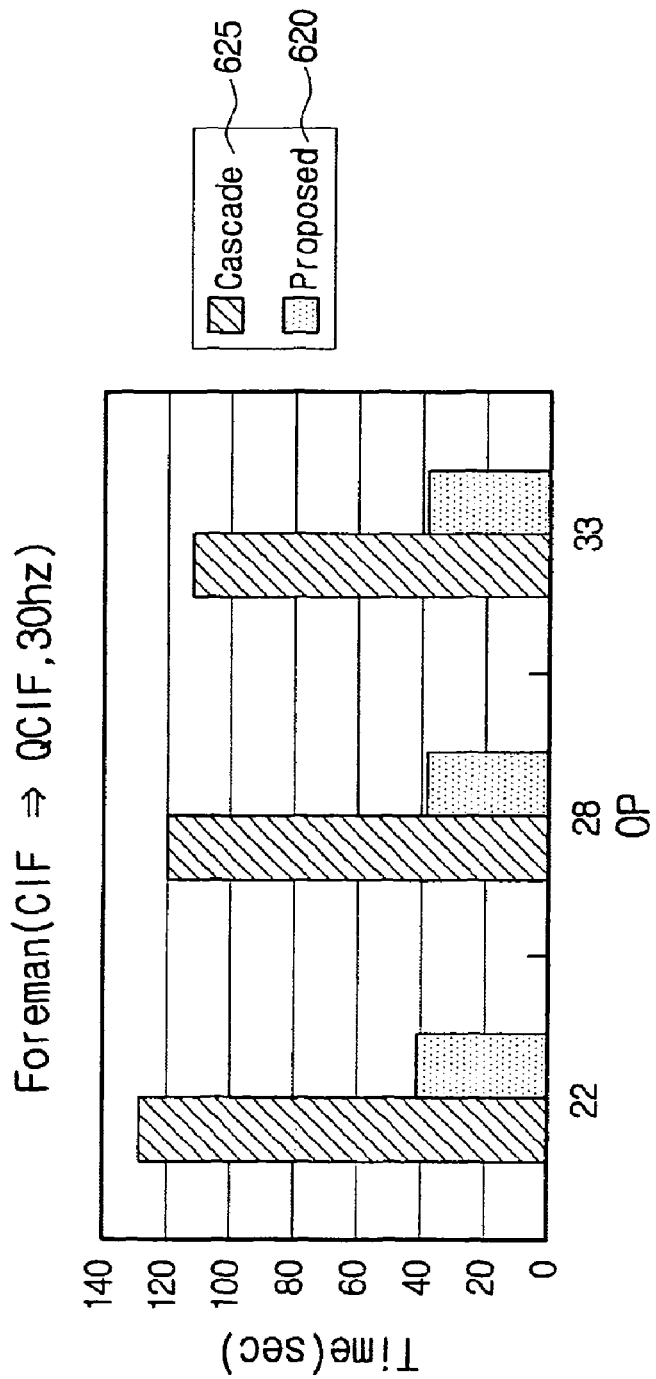
Figure 6C:
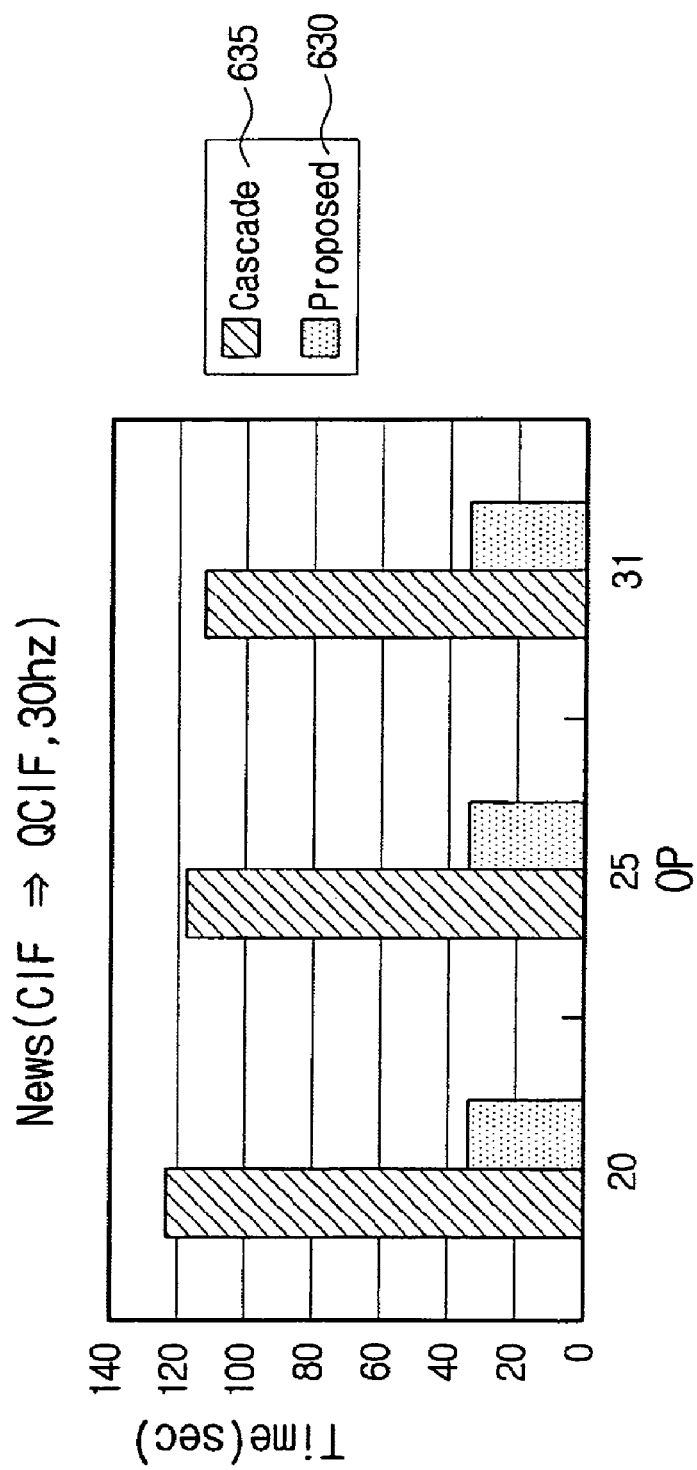
Figure 6E:
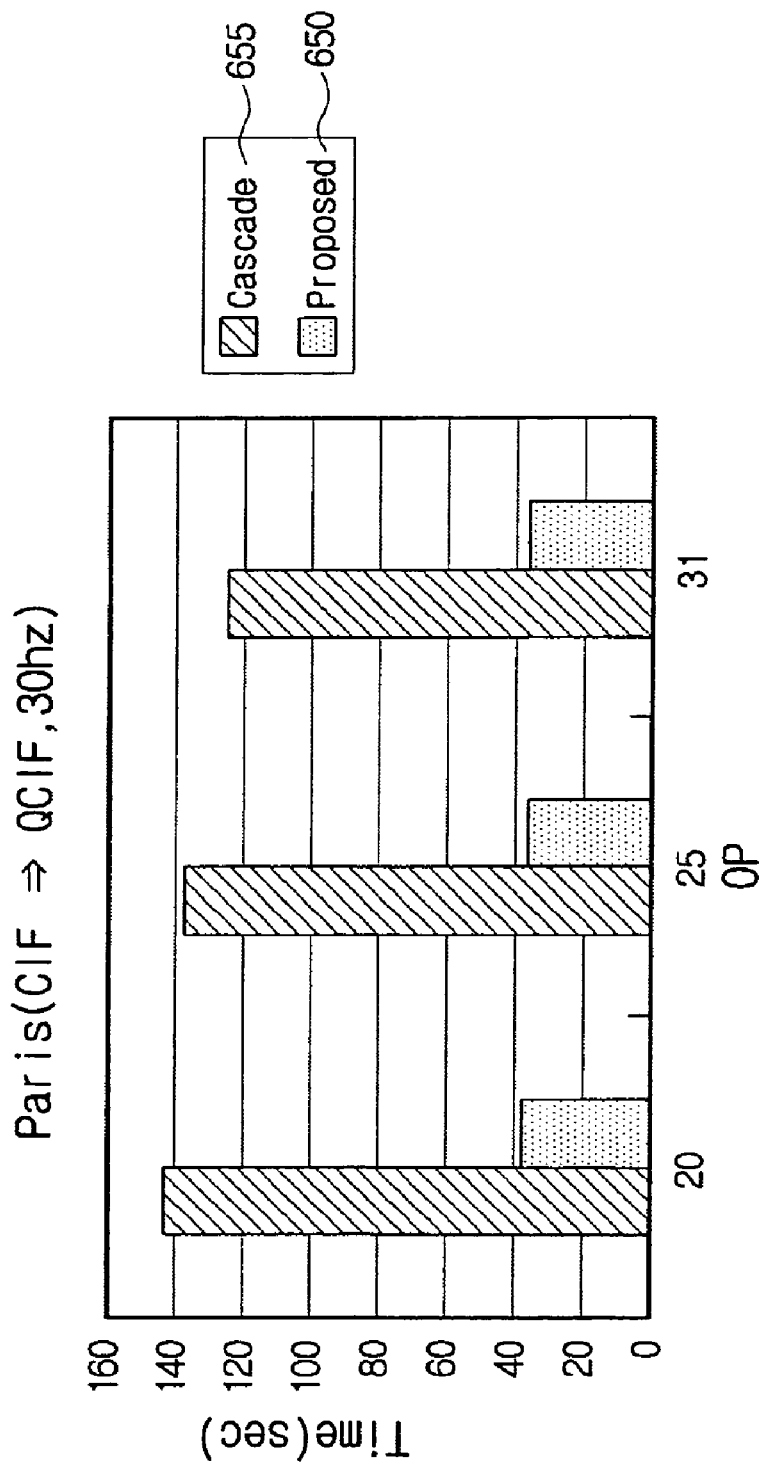
Figure 6F:
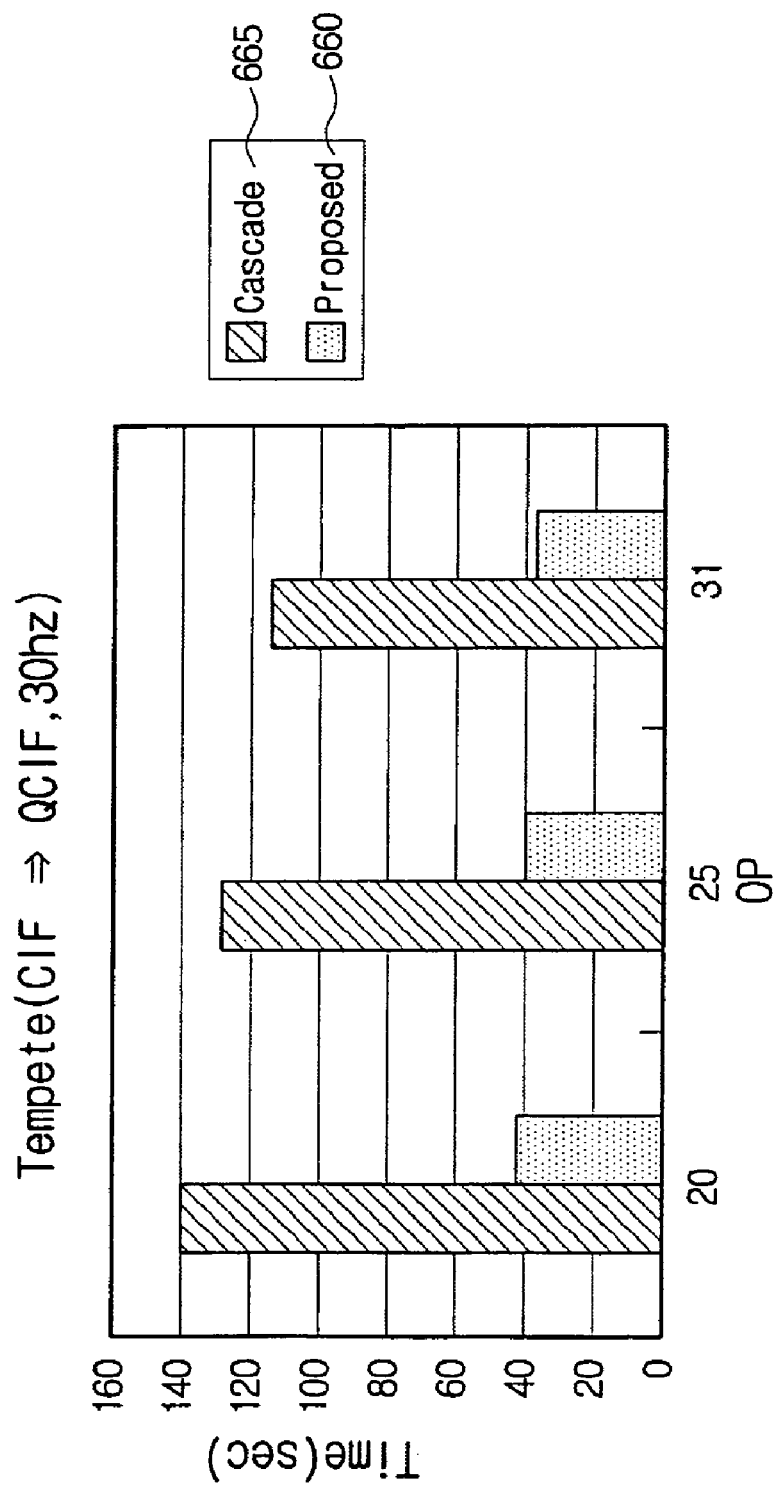

FIG. 4 is a flow diagram illustrating a pixel-domain transcoding method according to an exemplary embodiment of the invention. Now, the entire flow of the transcoding method which reduces the image size to ½ in the pixel domain is described with reference to FIG. 4. Here, it is supposed that the block mode which can be determined for completing the transcoding process to one macro block is any one of the inter modes of 16×16, 16×8, and 8×16, the intra 16×16 mode, and the skip mode in H.264. Hereinafter, the block modes in H/264 are referred to as candidate block modes.

The H.264 encoder (or the mode determining unit) receives a decompressed CIF image from the MPEG-4 decoder in S410 and generates a QCIF image with an image size reduced to ½ through the use of an average filtering method in S420. When 2×2 macro blocks are input in S410, the 2×2. macro blocks are converted into a 1×1 macro block in S420. In S410, the CIF image can be input in a unit of predetermined macro blocks, but even when the CIF image is not input in a unit of macro blocks, the CIF image can be processed in a unit of predetermined macro blocks.

In S430, the H.264 encoder (or the mode determining unit) calculates mean square errors (MSE) of the respective four modes (for example, vertical prediction, horizontal prediction, DC prediction, and plane prediction), supposed that the intra mode (that is, the intra 16×16 mode) among the candidate block modes is considered for the QCIF image. The mode having the least MSE is selected among the four modes (for example, vertical prediction, horizontal prediction, DC prediction, and plane prediction) of the intra 16×16 mode.

In S440, the H.264 encoder (or the mode determining unit) performs the rate-distortion optimization (RDO) to the other modes (that is, the candidate block modes other than the intra 16×16 mode) among the candidate block modes for the QCIF image and the intra 16×16 mode determined in S430. The mode having the least RDO is selected by performing the RDO to the respective modes and then the encoding process for the corresponding macro block is performed with the selected mode (S450).

Through these steps, the transcoding for one macro block is finished and the above-mentioned steps are repeated for the transcoding of the subsequent macro blocks.

It has hitherto been exemplified that the candidate block mode for the pixel-domain transcoding is one of the inter modes of 16×16, 16×8, and 8×16, the intra 16×16 mode, and the skip mode in H.264. However, it is obvious that the candidate block mode can further include at least one of the inter modes of 8×8, 8×4, 4×8, and 4×4 and the intra 4×4 mode.

This can be more apparently understood as shown in the following table by referring to ratios of the block modes determined for transcoding the macro block input in S410.

| MPEG-4 (%) H.264 (%) | | Inter 16 × 16 (54%) | Inter 8 × 8 (10.8%) | SKIP (33.8%) | Intra 16 × 16 (1.4%) |
|---|---|---|---|---|---|
| Inter Mode | 16 × 16 | 42.9% | 11.6% | 6.5% | 3% |
|  | 16 × 8 | 13% | 12.7% | 1% | 1.7% |
|  | 8 × 16 | 13.2% | 14.3% | 1% | 1.7% |
| Inter Mode | P8 × 8   8 × 8 | 12% | 28% | 0.3% | 5.4% |
|  | 8 × 4 | 3% | 7% | 0% | 1.2% |
|  | 4 × 8 | 3.2% | 7.7% | 0% | 0.6% |
|  | 4 × 4 | 1.6% | 9% | 0% | 11% |
| Intra Mode | 16 × 16 | 0.9% | 0.5% | 1% | 1.7% |
|  | 4 × 4 | 0.6% | 9.1% | 0% | 60.7% |
|  | SKIP | 9.6% | 0.1% | 90.2% | 0% |
| TOTAL |  | 100% | 100% | 100% | 100% |

Now, the performance of the block modes according to the invention is described with reference to the test results for various image sequences.

The test was carried out by the use of JM42 (Joint Model) encoder supporting the H.264 (MPEG-4 Part 10 AVC) BP and a MoMuSys decoder supporting the MPEG-4 SP. The test was carried out by using bit streams of six CIF (352×288) images which are stored at the frame rate of 30 Hz and used as test images at the time of developing H.264 with a Pentium IV 2.66 GHz PC.

FIGS. 5A to 5F show graphs of the rate-distortion curves of the respective images obtained by transcoding the CIF images of 30 Hz into the QCIF images with the image size reduced to ½ in the pixel domain. FIG. 6A to 6F show processing time graphs of the respective images obtained by transcoding the CIF images of 30 Hz into the QCIF images with the image size reduced to ½ in the pixel domain. Here, as the test images, Mobile & Calendar is used in FIGS. 5A and 6A, News is used in FIGS. 5B and 6B, Foreman is used in FIGS. 5C and 6C, Silent is used in FIGS. 5D and 6D, Paris is used in FIGS. 5E and 6E, and Templet is used in FIGS. 5F and 6F.

Referring to the rate-distortion curves and the processing time graphs, the rate-distortion graphs 510, 520, 530, 540, 550, and 560 employing the transcoding method according to the invention exhibit the loss of about 0.5 dB or less in average, in comparison with the rate-distortion graphs 515, 525, 535, 545, 555, and 565 employing the cascade pixel-domain transcoding method of performing the MPEG-4 decoding and the entire H.264 encoding. Exceptionally, the Foreman images 530 and 535 have the loss of about 1 dB.

However, the processing time graphs 610, 620, 630, 640, 650, and 660 employing the transcoding method according to the invention exhibit that the total processing time is shortened by 3 to 3.5 times, in comparison with the processing time graphs 515, 525, 535, 545, 555, and 565 employing the cascade pixel-domain transcoding method of performing the MPEG-4 decoding and the entire H.264 encoding.

Figure 7A:
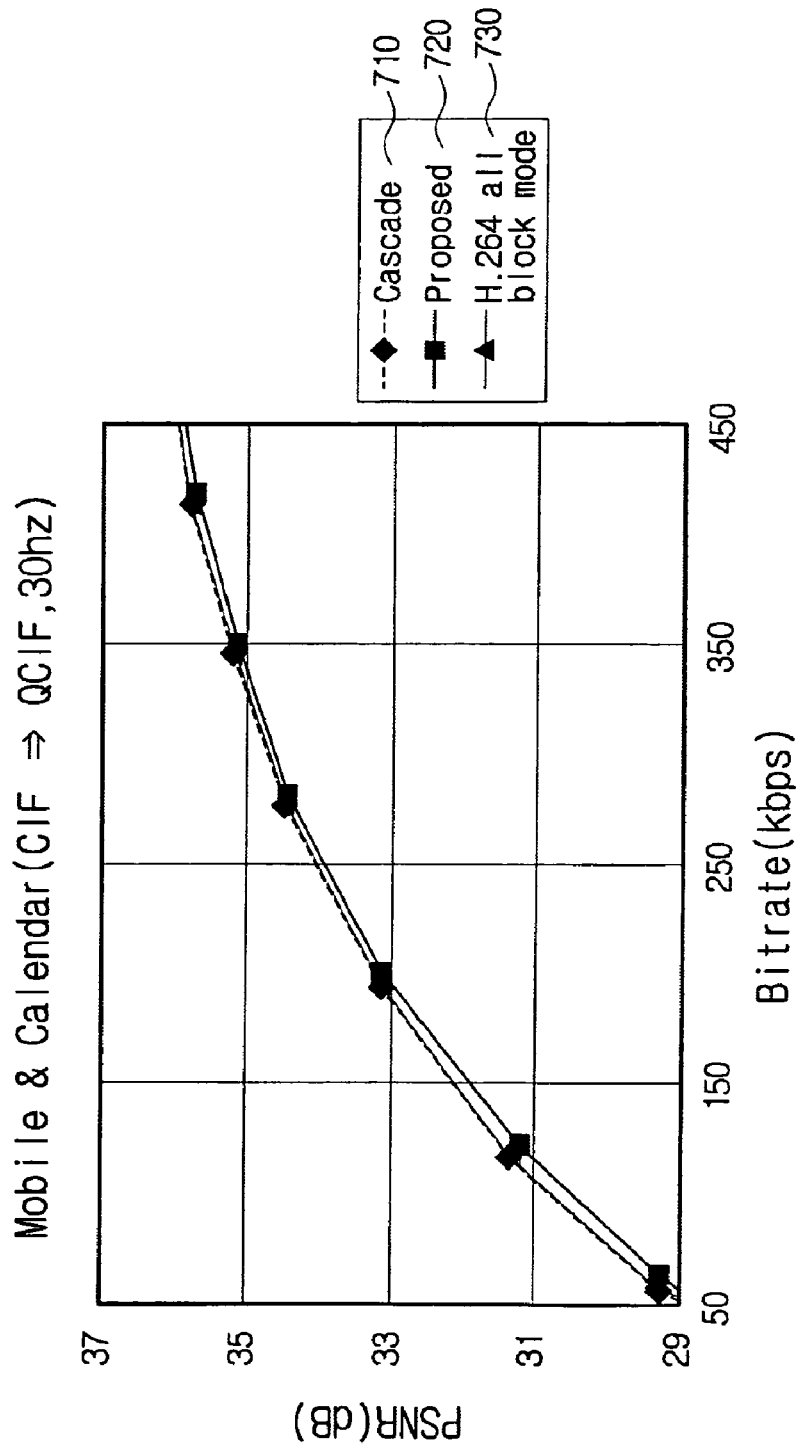
FIGS. 7A and 7B and FIGS. 8A and 8B are graphs illustrating comparison between the rate-distortion curves and the processing time graphs of test images.
Figure 7B:
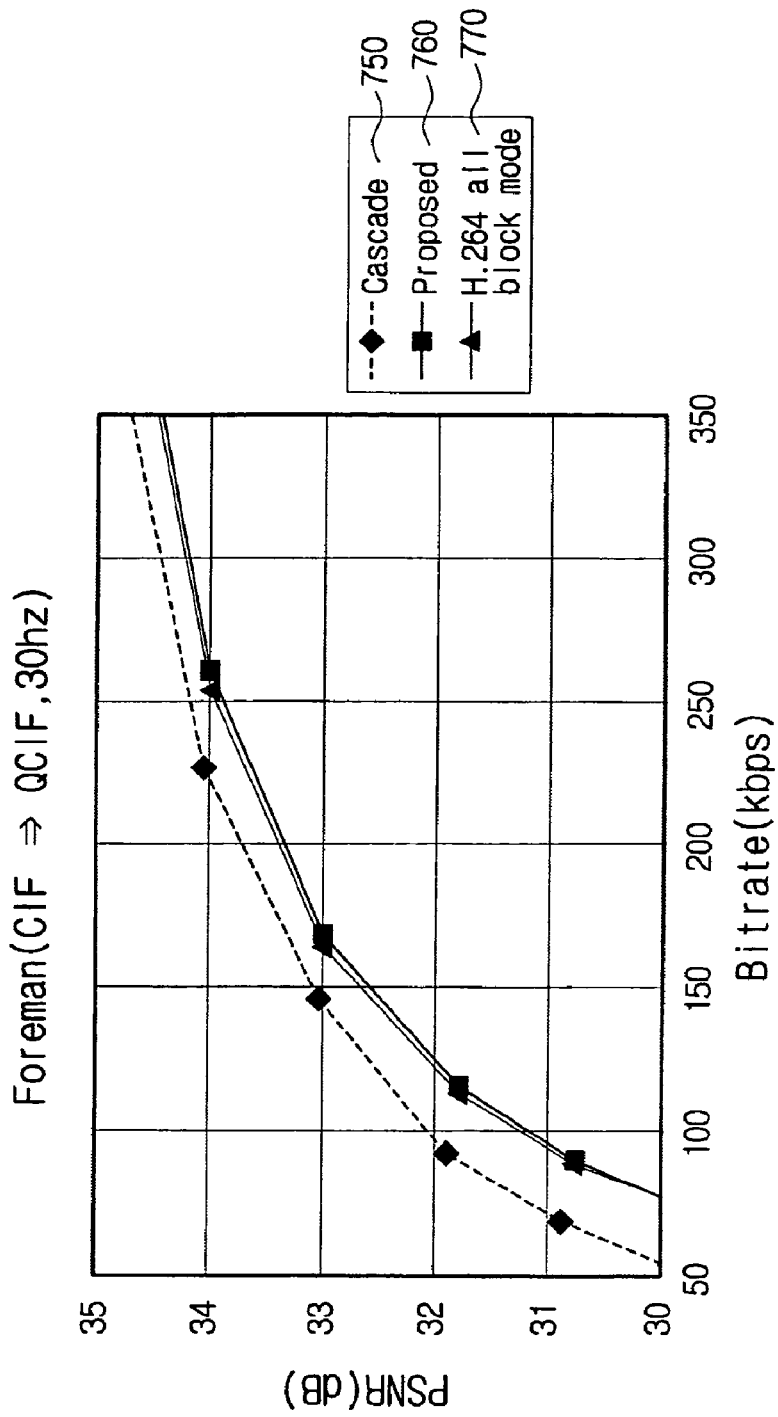
Figure 8A:
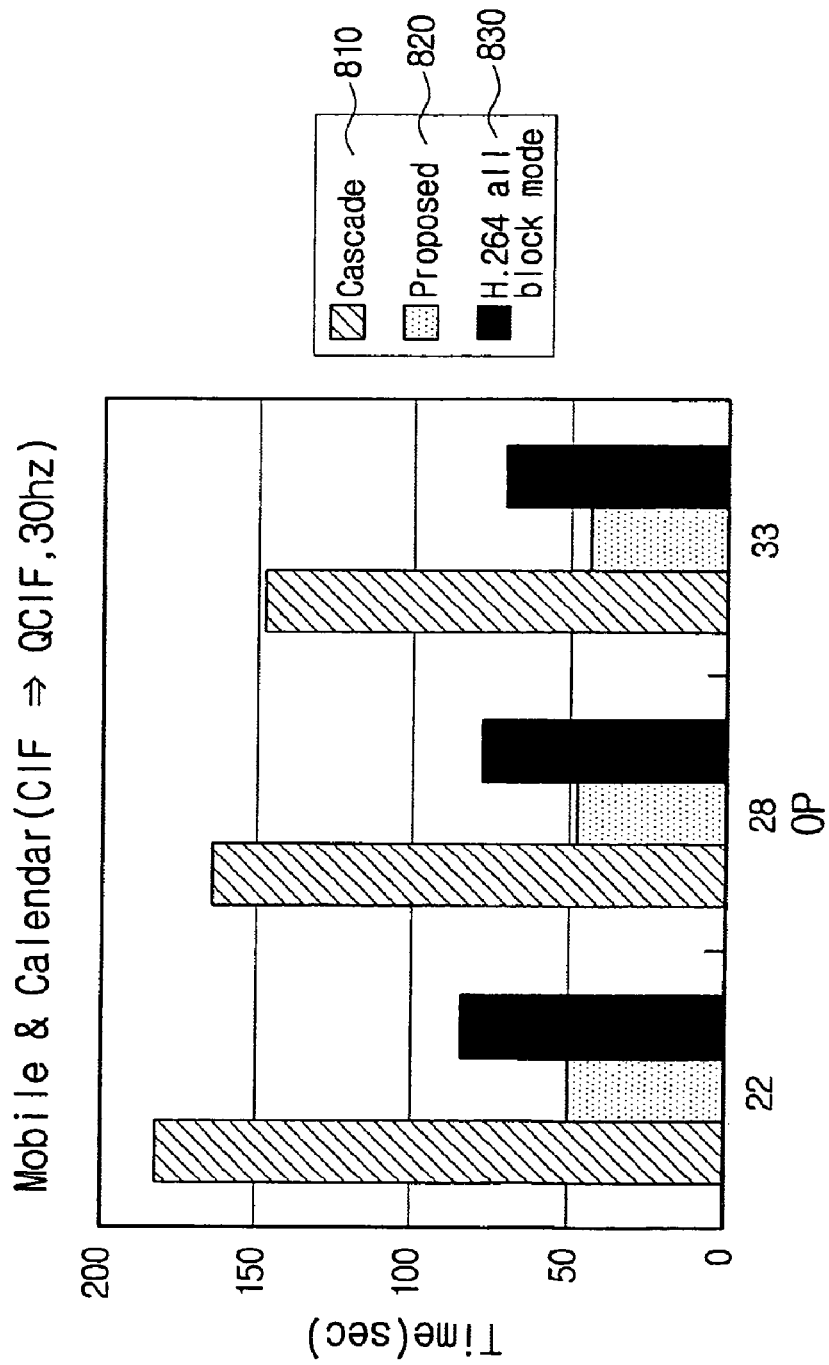
Figure 8B:
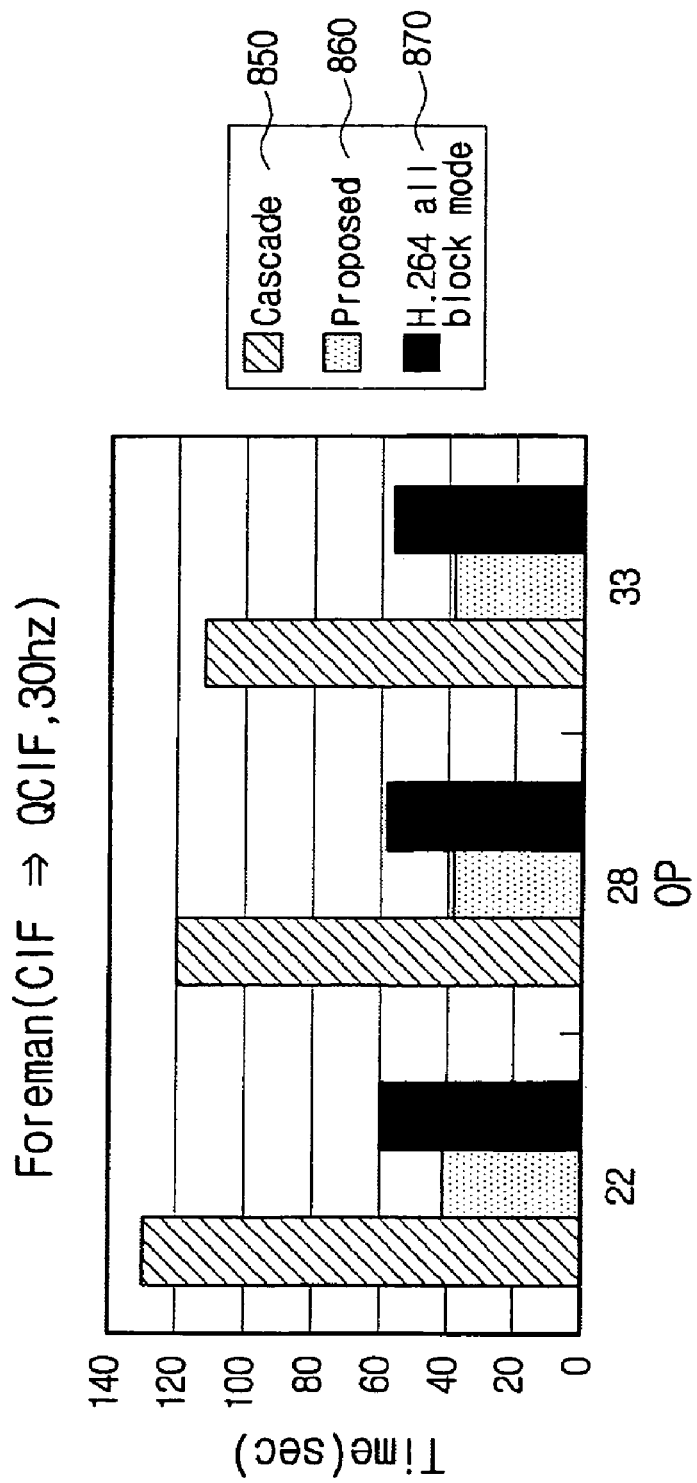

FIGS. 7A and 7B show transcoding rate-distortion curves 710 and 750 of the cascade pixel-domain transcoding for two test images, transcoding rate-distortion curves 720 and 760 using only five block modes in H.264 according to the invention, and transcoding rate-distortion curves 730 and 770 using all the block modes in H.264. FIGS. 8A and 8B show transcoding time graphs 820 and 860 using only five block modes in H.264 according to the invention and transcoding time graphs 830 and 870 using all the block modes in H.264. Here, as the test images, the Mobile & Calendar image is used in FIGS. 7A and 8A and the Foreman image is used in FIGS. 7B and 8B.

The image quality graphs 720 and 760 employing the transcoding method according to the invention exhibit slight deterioration in image quality in comparison with the image quality graphs 730 and 770 employing the transcoding method using all the block modes in H.264, but exhibit the processing time shortened by about ⅓ times.

Figure 9:
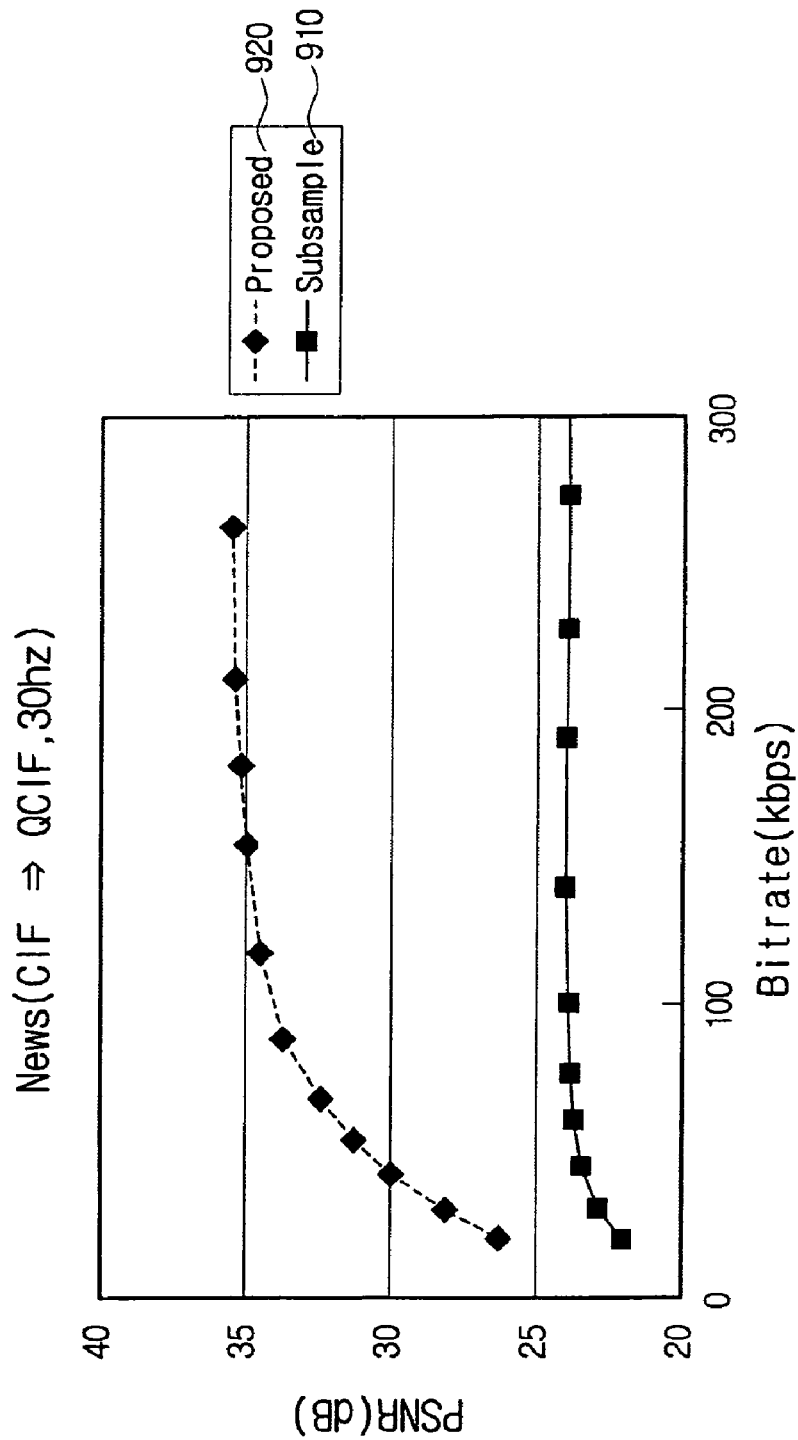
FIG. 9 is a graph illustrating comparison in down-sampling performance between the image down-sampling method according to an exemplary embodiment of the invention and the conventional sub-sampling method.

FIG. 9 is a graph illustrating comparison in down-sampling performance between the image down-sampling method according to an exemplary embodiment of the invention and the conventional sub-sampling method. Here, the News image is used as the test image.

Referring to FIG. 9, the difference in performance when the average filtering method according to the invention and the sub-sampling method selecting only one pixel from 2×2 four pixels are used at the time of down-sampling an image is shown. The graph 910 employing the sub-sampling method exhibits large deterioration in image quality in comparison with the graph 920 employing the average filtering method. Accordingly, it can be seen that the down-sampling of images is preferably performed by using the average filtering method according to the invention.

At the time of performing the motion estimation in H.264, only five block types of the inter modes of 16×16, 16×8, and 8×16, the intra 16×16 mode, and the skip mode according to the invention are used, where MSE instead of RDO is used for the intra block. A sync filtering method such as (5, 11, 11, 5) or (2, 0, −4, −3, 5, 19, 5, −3, −4, 0, 2) may be used instead of the average filtering method at the time of down-sampling the image.

According to the invention described above, it is possible to provide the image down-sampling transcoding method and device which can reduce the complexity while maintaining the image quality by re-using the information on the macro blocks.

In addition, it is possible to down-sample an image from MPEG-4 to H.264 at a high speed.

Although the exemplary embodiments of the present invention have been described, the present invention is not limited to the embodiments, but it can be understood by those skilled in the art that the invention may be modified in various forms without departing from the spirit and scope of the appended claims.

What is claimed is:

1. A computer program product stored on a non-transitory, computer-readable medium comprising instructions for causing a processor to perform an image down-sampling transcoding method for converting a first image having a first format into a second image having a second format, the image down-sampling transcoding method comprising:

(a) decoding a bit stream encoded in the first format;

(b) down-sampling a macro block of a predetermined unit in the decoded first image by the use of a predetermined filtering method;

(c) calculating rate-distortion costs corresponding to the down-sampled macro block of the first image by performing a predetermined calculation method for each of candidate block modes; and (d) performing an encoding process with the candidate block mode having the least rate-distortion cost, wherein the candidate block mode comprises one or more of a first candidate block mode and a second candidate block mode, the first candidate block mode comprises one or more of a plurality of intra block modes having the second format, and the second candidate block mode comprises one or more of a plurality of inter block modes and a skip mode having the second format, wherein the predetermined calculation method comprises a mean square error (MSE) method and a rate-distortion optimization (RDO) method and wherein the predetermined calculation method in (d) is performed as follows:

when a candidate block mode is an intra block mode, determining the first candidate block mode by performing the MSE method for every detail mode comprised in every intra block mode in the second format to calculate an MSE cost and selecting a detail mode having the least MSE cost as the first candidate block mode, and then performing the RDO method on the first candidate block mode to calculate a rate-distortion cost of the first candidate block mode; and when the candidate block mode is not the intra block mode, performing the RDO method for every detail mode comprised in every inter block mode in the second format and a skip mode to calculate rate-distortion costs for every detail mode comprised in every inter block mode in the second format and the skip mode.

2. The computer program product according to claim 1, wherein the predetermined filtering method in (b) is any one of an average filtering method and a sync filtering method.

3. The computer program product according to claim 1, wherein the plurality of intra block modes comprise an intra 16×16 mode and an intra 4×4 mode and the plurality of inter block modes comprise an inter 16×16 mode, an inter 16×8 mode, an inter 8×16 mode, an inter 8×8 mode, an inter 4×8 mode, an inter 8×4 mode, and an inter 4×4 mode.

4. The computer program product according to claim 1, wherein a motion estimation process is performed to the candidate block modes by the use of a motion vector generated in (a).

5. An image down-sampling transcoding device for converting a first image having a first format into a second image having a second format, the image down-sampling transcoding device comprising:

a decoding unit decoding a bit stream encoded in the first format;

a down-sampling unit down-sampling a macro block of a predetermined unit in the decoded first image by the use of a predetermined filtering method;

a calculation unit calculating rate-distortion costs corresponding to the down-sampled macro block of the first image by performing a predetermined calculation method for each of candidate block modes in the second format; and an encoding unit performing an encoding process in the second format with the candidate block mode having the least rate-distortion cost, wherein the candidate block mode comprises one or more of a first candidate block mode and a second candidate block mode, the first candidate block mode comprises one or more of a plurality of intra block modes having the second format, and the second candidate block mode comprises one or more of a plurality of inter block modes and a skip mode having the second format, wherein the predetermined calculation method comprises a mean square error (MSE) method and a rate-distortion optimization (RDO) method and wherein the calculation unit performs the predetermined calculation method as follows:

when a candidate block mode is an intra block mode, determining the first candidate block mode by performing the MSE method for every detail mode comprised in every intra block mode in the second format to calculate an MSE cost and selecting a detail mode having the least MSE cost as the first candidate block mode, and then performing the RDO method on the first candidate block mode to calculate a rate-distortion cost of the first candidate block mode; and when the candidate block mode is not the intra block mode, performing the RDO method for every detail mode comprised in every inter block mode in the second format and a skip mode to calculate rate-distortion costs for every detail mode comprised in every inter block mode in the second format and the skip mode.

6. The image down-sampling transcoding device according to claim 5, further comprising a motion estimation unit performs a motion estimation process to the down-sampled first image by the use of a motion vector in the first format.

7. The image down-sampling transcoding device according to claim 5, wherein the down-sampling unit performs the down-sampling process by the use of any one of an average filtering method and a sync filtering method.

8. The image down-sampling transcoding device according to claim 5, wherein the plurality of intra block modes comprise an intra 16×16 mode and an intra 4×4 mode and the plurality of inter block modes comprise an inter 16×16 mode, an inter 16×8 mode, an inter 8×16 mode, an inter 8×8, an inter 4×8 mode, an inter 8×4 mode, and an inter 4×4 mode.

* * * * *